No. 812,674. PATENTED FEB. 13, 1906.
V. OSBORNE.
MEASURING INSTRUMENT.
APPLICATION FILED OCT. 31, 1904.

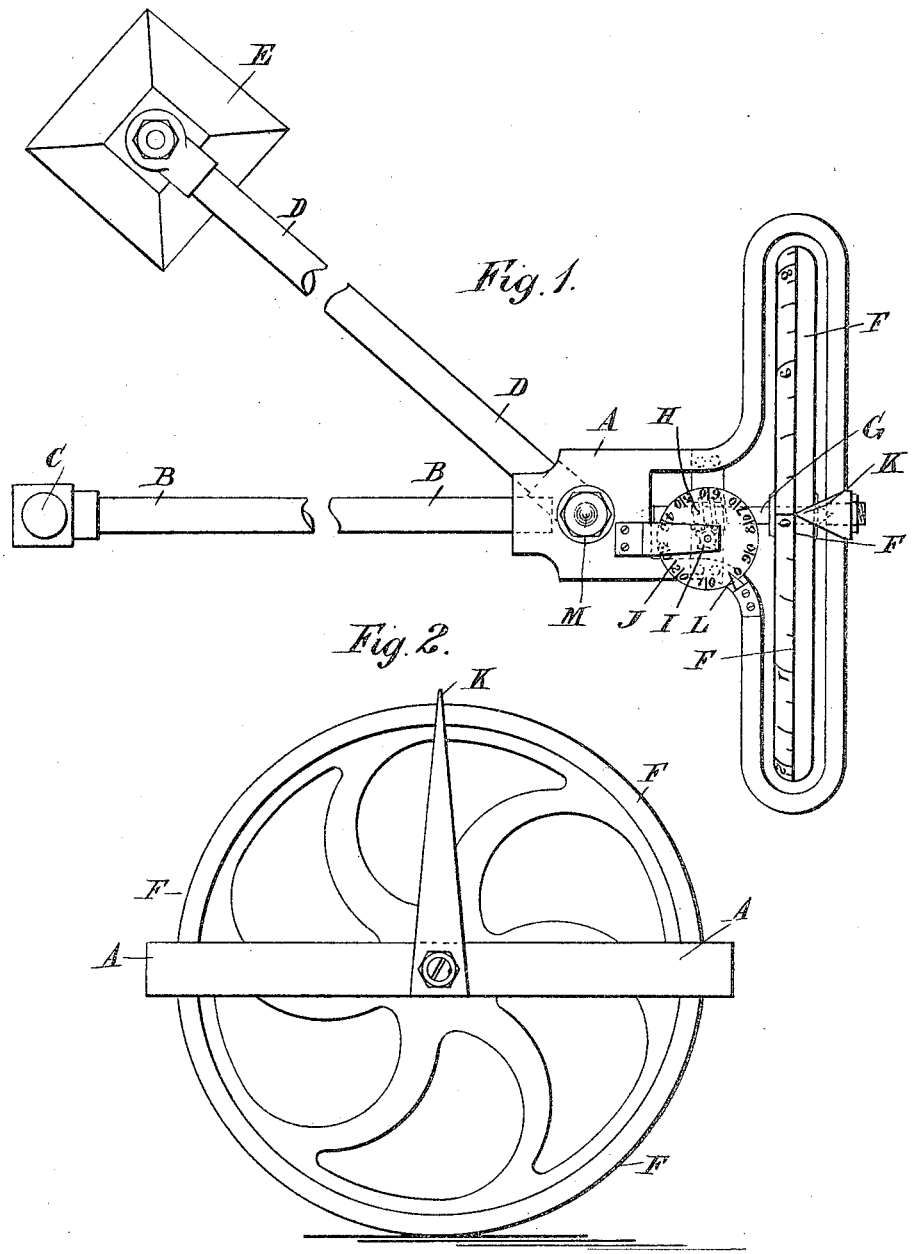

2 SHEETS—SHEET 2.

Witnesses:

Inventor
Vivian Osborne

UNITED STATES PATENT OFFICE.

VIVIAN OSBORNE, OF LONDON, ENGLAND, ASSIGNOR OF TWO-THIRDS TO JOHN JOSEPH CONNOLLY AND SAMUEL FREDERICK CONNOLLY, OF LONDON, ENGLAND.

MEASURING INSTRUMENT.

No. 812,674.     Specification of Letters Patent.     Patented Feb. 13, 1906.

Application filed October 31, 1904. Serial No. 230,805.

*To all whom it may concern:*

Be it known that I, VIVIAN OSBORNE, a subject of the King of Great Britain, residing at 101-104 Chalton street, Euston Road, London, England, have invented certain new and useful Improvements in Measuring Instruments of which the following is a specification.

The object of this invention is to construct an instrument or apparatus for measuring and indicating the superficial area of hides, skins, or other surfaces by placing the apparatus on the hide or skin or other surface or adjacent thereto and following the perimeter of the leather with a tracer forming part of or attached to the apparatus.

The invention and its method of working will be clearly understood from the following description, aided by the accompanying sheet of drawings, in which—

Figure 3:
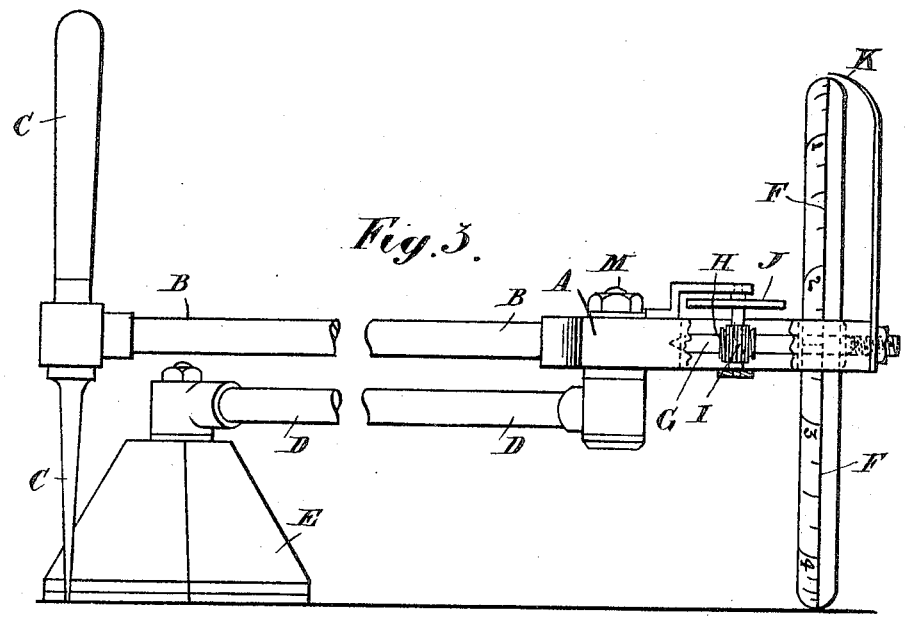
Figure 4:
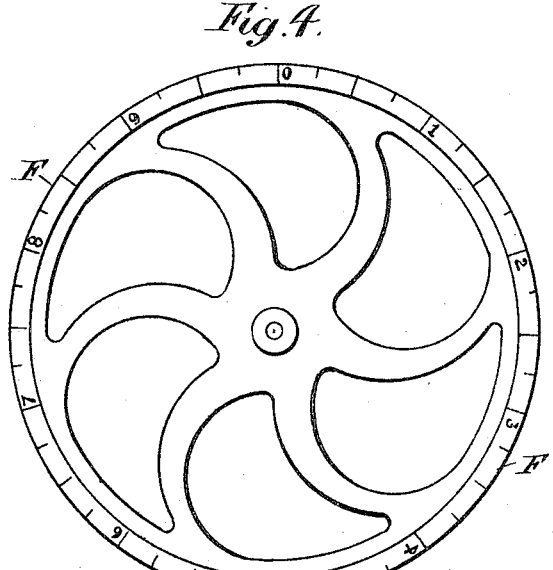

Figure 1 is a plan of the apparatus. Fig. 2 is an end elevation from the wheel end. Fig. 3 is a side view; and Fig. 4 an elevation of the traveling wheel, showing the markings.

The apparatus consists of a frame A, carrying a rod B, having at its free end a tracer C and having pivotally connected to it another rod D, carrying at its free end a pivoted weight E or means on which the apparatus is fulcrumed for its proper movement.

The frame A carries a wheel F, having the indication of units arranged around its periphery, and the axle G of such wheel is coaxial with the rod B and also lies in the same vertical plane as the point of junction of the two arms and the tracer C. Such axle also carries a worm H, which meshes with a pinion I, the axle of which carries a disk J, being the indications of tens, pointers K L being affixed to the frame A to indicate the units on the wheel F and the tens on the disk J, respectively.

The weight E and the tracer C are of such a height that the rods B D and frame A move in parallel planes.

The wheel F, the circumference of which preferably rolls upon the surface of the leather, is graduated into divisions and subdivisions to "read" to square feet and fractions of square feet, and the small dial J attached to it records the number of complete revolutions made by the wheel F.

To find the area of the hide to be measured, the apparatus is preferably stood upon the surface of the leather, wheel F is revolved for the pointer K of the rolling-wheel F to be at zero of its scale, and the hand of the dial in like manner to the zero of the dial-scale. The tracer C at the end of the rod B is then made to carefully follow the edge of the hide once completely round, thus causing the wheel F to rotate on its axis. On reaching the starting-point the indications on the dials are read by adding the units (or fractions) which appear underneath the pointer K of the rolling wheel F to the "tens" appearing beneath the hand L of the small dial J, recording complete revolutions. The fixed point E being placed within the shape to be measured, the area is actually given by length of rod B × circumferential roll of the wheel F + $(D^2 + B^2 + 2B \times$ distance from the point M to F$)\pi$. It is, however, possible by choosing proper lengths for the arms B D, the distance M to F, and the circumference of the rolling wheel F to nevertheless obtain the required area by simply reading the pointers of the wheel F and dial J, as explained above, thus making the arm B equal four and four-fifths feet in length, thus making the arm D equal two and one-half feet in length. The distance M to F equals three and three-sixteenths inches, equals $\frac{51}{16 \times 12}$ feet, and the circumference of F equals twenty-five inches, equals two and one-twelfth feet. The expression:

$$\frac{\text{Area in}}{\text{square feet}} = \tfrac{24}{5} \times \tfrac{25}{12} \text{ times number of revolutions of wheel} + (\tfrac{24}{5}{}^2 + \tfrac{5}{2}{}^2 + 2 \times \tfrac{24}{5} \times 3\tfrac{3}{16} \text{ inches.}) \pi.$$

$$\frac{\text{Area in}}{\text{square feet}} = 10 \text{ times number of revolutions of wheel} + \tfrac{576}{25} + \tfrac{25}{4} + \tfrac{2 \times 24 \times 51}{5 \times 16 \times 12} \pi.$$

$$\frac{\text{Area in}}{\text{square feet}} = 10 \text{ times number of revolutions of wheel} + \tfrac{576}{25} + \tfrac{25}{4} + \tfrac{51}{20} \pi.$$

$$\frac{\text{Area in}}{\text{square feet}} = 10 \text{ times number of revolutions of wheel} + \tfrac{2304+625+255}{100} \pi.$$

$$\frac{\text{Area in}}{\text{square feet}} = 10 \text{ times number of revolutions of wheel} + \tfrac{3184}{100} \pi.$$

Square feet = 10 times number of revolutions of wheel + 100.

The wheel F, preferably graduated to show tenths of its circumference, these indicating square feet, other markings indicate fractions of square feet, so that no calculations are required on the part of the operator. As, however, no hide reaches one hundred square feet in area, this first quantity is negative, and it at first appears necessary to subtract it from one hundred. As a consequence, however, of constructing the scale to record exactly up to one hundred square feet (making it, so to speak, "endless") and graduating it in a backward direction the necessary subtraction is effected automatically. The instrument thus gives the correct area by simply reading the figures appearing beneath the pointers, whether the fixed point E is placed within or without the hide or skin to be measured.

The machine above described is made to always show the area required without any calculation whatever, is by constructing it so that the latter part of the formula in the specification gives an area larger than any one of the objects to be measured, and by graduating the dial, &c., exactly up to this arranged area and in a backward direction. In the machine described this area is made to be one hundred square feet, and so the dial, &c., is graduated in a backward direction up to one hundred.

What I claim, and desire to secure by Letters Patent, is—

In an instrument of the class described, a frame having pointers, a rod fixedly secured to said frame, a tracer connected to the free end of said rod, a worm-threaded axle mounted within the frame and arranged in direct longitudinal alinement with said rod, a graduated wheel fixed to said axle, a graduated disk actuated by said worm-thread for recording the rotation of the wheel, a weight, and a rod pivotally connected to the latter, and to the frame at a point intermediate the graduated wheel and the tracer.

In testimony whereof I have hereunto set my hand in presence of two subscribing witnesses.

VIVIAN OSBORNE.

Witnesses:
 WM. O. BROWN,
 FRED C. SMITH.